Patented May 9, 1933

1,907,496

UNITED STATES PATENT OFFICE

WILLIAM ANTON BUEDINGER AND SEWARD GROVES BYAM, OF FAIRFIELD, CONNECTICUT, ASSIGNORS TO E. I. DU PONT DE NEMOURS & COMPANY, OF WILMINGTON, DELAWARE, A CORPORATION OF DELAWARE

GAS CELL MATERIAL

No Drawing.    Application filed October 3, 1929. Serial No. 397,149.

This invention relates to impermeable cloth; more particularly it relates to a cloth, impermeable to gases, which will find its major use in the gas cells of dirigible airships and in the fabric of blimps and balloons. The invention relates still further to a fabric-viscose-rubber substitute for the gold-beater's skin now used in making bags of this type. The invention further relates to a new and useful method of preparing such cloth.

Cloth to be substituted for gold-beater's skin is made from a fabric coated with a mixture of viscose and rubber latex. This process is described in the recent patent to Jacobsohn and Truscott, #1,665,500. It has been found in practice that the large amount of handling required in this process has somewhat tended to increase the permeability of the resulting fabric. It was found that unregenerated viscose-latex coating material was suitably impermeable, but that after regenerating the permeability had been increased due, presumably, to handling in the process. It was apparent, therefore, that the quality of the product would be greatly increased if a process could be evolved which would to a large extent eliminate this handling.

This invention has as an object the preparation of an impermeable, flexible membrane or covering which may be manufactured inexpensively and fabricated into gas cells. A further object of the invention is to provide a fabric of the above general character which will be superior to prior fabrics whether of gold-beater's skin type or other types. A still further object is to provide a new process of preparing such fabrics, a process which will render excessive handling unnecessary. Other objects of the invention will be in part apparent, and in part set forth in the following specification.

These objects are accomplished by the following invention which consists in a preparation of viscose-latex cloth by a new and improved method of making impermeable cloth, and particularly consists in a new method of regenerating cloth which has been treated with a viscose-latex impermeable layer. This new method consists, generally speaking, in a dry method of cellulose regeneration which utilizes vapors of acid gases.

The following example will illustrate the method of preparing gas impermeable fabric from a mixture of viscose-latex.

Example

Add slowly to a 7% concentration of viscose (cellulose xanthate), glycerine equal to 5% of the weight of viscose. The glycerine is added to the viscose slowly and with constant stirring. After the addition of the glycerine enough rubber latex, containing about 37% rubber solids is added to make a mixture the solids of which are 70% viscose and 30% rubber, and containing glycerine in an amount equal to 5% of the viscose. It is advantageous to use viscose in a green state because ripened viscose will result in a certain amount of coagulation in mixture or on coating.

The fabric used is coated with a rubber compound made on somewhat the following formula:—

| | |
|---|---|
| Smoked sheet | 100 parts |
| Factice | 25 parts |
| Zinc oxide | 20 parts |
| Neozone | 1 part. |

This coating is done by methods well-known in the art, such as by means of a spreader. This rubber coated fabric is then sized with an adhesive which may be gelatine or glue. The viscose-latex mixture described above is then spread over the sized rubber on a rubber spreading machine. Although it has been found that approximately eight coats of viscose-latex is required to secure suitable impermeability, as many additional coats are added as the specific weight and absolute permeability desired in the resulting product indicate to be desirable. Each coat is dried by passing a current of air at the temperature of approximately 40° C. over its surface before the application of the succeeding coat.

After the material has been thus prepared it is advisable in order to secure a suitable product, that there be regeneration. The method of regeneration which we use consists of the following. After the last coat of viscose-latex has been applied to the surface of the rubber cloth, the material is festooned in an air-tight chamber in which it is exposed to an approximately 50% concentration of sulphur dioxide. The temperature of the room is kept at atmospheric and the exposure to the acid gas is continued for about thirty minutes or until regeneration is completed. It is to be noticed that in this method of regeneration heating of the product is unnecessary, which results in a much more uniform and considerably improved fabric. As soon as the regeneration is completed, which generally requires not more than thirty minutes, the chamber is emptied of acid gases and thoroughly aerated. This aeration is continued until the chamber has been thoroughly cleared of the acid fumes. After the aeration the material is subjected to the fumes of anhydrous ammonia to neutralize all free acid.

We have found that other acid gases than sulphur dioxide may be used. Success has been had with acetic acid gas, for example, but the sulphur dioxide appears at present to be more suitable. It is unnecessary to use a non-vulcanizing compound such as described above; a vulcanizing cement may be substituted in place of this if it is desired. It must be understood furthermore that the proportion of the ingredients may be varied within wide limits, and that although the temperature at which the reaction yields an excellent product is atmospheric, this is not to be construed as a limitation to atmospheric temperature. Variations of temperature and pressure can be used to conform to the desire of the engineer.

It is to be understood that the use of the invention is not limited to lighter-than-air craft but could be used in the diaphrams of gas meters, or simple gas-impermeable membranes and tissues, in gas masks, gas-proof clothing such as is in process of development for the army, boat sails. Innumerable other uses will occur to persons skilled in the art.

The advantages of this improved process are most numerous and consist in the elimination of all wet washing processes necessary with previous methods of regeneration, the elimination of the major portion of handling which was previously required and which resulted in increased permeability, in the elimination of the steps which required the passing of the material through glycerine after washing (an elimination which is made possible by the fact that the absence of a washing process leaves the glycerine in the material), in the ability to incorporate in the original viscose-latex mixture the amount of glycerine desired in the final product, and in a highly simplified process particularly in the matters of regeneration, production and decreased cost.

We have found that this system of regeneration is suited, not only to the specific use above described, but to use in most varied processes. Although it is impossible to list all such uses it will be immediately apparent that it is applicable to any process in which cellulose xanthate (or viscose) on a base is regenerated.

It will be understood, of course, that the invention is susceptible of wide variation and is not limited to the precise method set forth above. For example it might be desirable to remove salts from the finished product after regeneration. This can be done by a simple washing process but in general is to be avoided because it requires handling and reglycerating, both of which are objectionable.

As many apparently widely different embodiments of this invention may be made without departing from the spirit and scope thereof, it is to be understood that we do not limit ourselves to the specific embodiments thereof except as defined in the appended claims.

We claim:

1. Method of preparing gas impermeable material comprising coating a fabric base with a rubber composition, superposing thereon an adhesive coating, superposing thereon a composition including viscose and latex, and exposing the coated side of said fabric base to an atmosphere of an acid gas.

2. Method of preparing gas impermeable material comprising coating a fabric base with a rubber composition, superposing thereon an adhesive coating, superposing thereon a composition including viscose and latex, and exposing the coated side of said fabric base to an atmosphere of sulphur dioxide.

3. Method of preparing gas impermeable material comprising coating a fabric base with a rubber composition, superposing thereon an adhesive coating, superposing thereon a composition including viscose, latex, and glycerin, and exposing the coated side of said fabric base to an atmosphere of sulphur dioxide.

4. Method of preparing gas impermeable material comprising coating a fabric base with a rubber composition, superposing thereon an adhesive coating, superposing thereon a composition including viscose, latex, and glycerin, exposing the coated side of said fabric base to an atmosphere of sulphur dioxide, and then exposing same to an atmosphere of ammonia to neutralize any acid formed.

5. Method of preparing gas impermeable material comprising coating a fabric base with a rubber composition, superposing thereon an adhesive coating, superposing thereon a composition including viscose, latex, and glycerin, exposing the coated side of said fabric base to an atmosphere of sulphur dioxide, aerating the material, and then exposing same to an atmosphere of ammonia, said last three steps being carried out at approximately atmospheric temperature.

In testimony whereof we affix our signatures.

WILLIAM ANTON BUEDINGER.
SEWARD GROVES BYAM.